(12) United States Patent
Mukkavilli et al.

(10) Patent No.: US 11,743,894 B2
(45) Date of Patent: *Aug. 29, 2023

(54) SUBFRAME STRUCTURE WITH EMBEDDED CONTROL SIGNALING

(71) Applicant: QUALCOMM Incorporated, San Diego, CA (US)

(72) Inventors: Krishna Kiran Mukkavilli, San Diego, CA (US); Jing Jiang, San Diego, CA (US); Tingfang Ji, San Diego, CA (US); Jamie Menjay Lin, San Diego, CA (US); Joseph Binamira Soriaga, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/216,386

(22) Filed: Mar. 29, 2021

(65) Prior Publication Data

US 2021/0219282 A1     Jul. 15, 2021

Related U.S. Application Data

(63) Continuation of application No. 16/752,465, filed on Jan. 24, 2020, now Pat. No. 11,463,993, which is a
(Continued)

(51) Int. Cl.
*H04W 72/20* (2023.01)
*H04B 7/0452* (2017.01)
(Continued)

(52) U.S. Cl.
CPC .......... *H04W 72/20* (2023.01); *H04B 7/0452* (2013.01); *H04L 5/0023* (2013.01);
(Continued)

(58) Field of Classification Search
CPC . H04W 72/0406; H04W 72/10; H04W 72/12; H04W 72/1242; H04B 7/0452;
(Continued)

(56) References Cited

U.S. PATENT DOCUMENTS 6,765,887 B1   7/2004   Shiu et al.
8,792,875 B2   7/2014   Dhanda et al.
(Continued)

FOREIGN PATENT DOCUMENTS

CN   101480098 A       7/2009
CN   101815355 A  *    8/2010
(Continued)

OTHER PUBLICATIONS

European Search Report—EP20198037—Search Authority—Munich—Jan. 26, 2021.
(Continued)

*Primary Examiner* — Samina F Choudhry
(74) *Attorney, Agent, or Firm* — QUALCOMM Incorporated

(57) ABSTRACT

An apparatus may utilize an air interface to transmit and/or receive a transmission during a first TTI that includes a second set of data overriding a first set of data scheduled for transmission during the first TTI. The air interface may further be utilized to transmit and/or receive a transmission after a duration of time that is less than a total time duration of the first TTI that includes an override indicator that is at least partially embedded in a data portion of a subframe. The override indicator may be configured to indicate that the first set of data scheduled for transmission during the first TTI is overridden by the second set of data having the higher priority. The override indicator may be transmitted after the second set of data is transmitted. The one or more additional TTIs may be after the first TTI.

30 Claims, 9 Drawing Sheets

Related U.S. Application Data continuation of application No. 14/952,685, filed on Nov. 25, 2015, now Pat. No. 10,595,302.

(60) Provisional application No. 62/133,391, filed on Mar. 15, 2015.

(51) Int. Cl.
  *H04L 5/00* (2006.01)
  *H04W 72/12* (2023.01)
  *H04W 72/56* (2023.01)
  *H04W 72/566* (2023.01)

(52) U.S. Cl.
  CPC .......... *H04L 5/0048* (2013.01); *H04L 5/0064* (2013.01); *H04L 5/0091* (2013.01); *H04W 72/12* (2013.01); *H04W 72/56* (2023.01); *H04W 72/569* (2023.01); *H04L 5/0053* (2013.01)

(58) Field of Classification Search
  CPC ... H04L 5/0023; H04L 5/0048; H04L 5/0091; H04L 5/0053
  See application file for complete search history.

(56) References Cited

U.S. PATENT DOCUMENTS

| | | | |
|---|---|---|---|
| 10,231,259 B2 | 3/2019 | Lin et al. | |
| 10,595,302 B2 | 3/2020 | Mukkavilli et al. | |
| 2006/0209970 A1* | 9/2006 | Kanterakis | H04L 1/0009 714/790 |
| 2008/0056118 A1* | 3/2008 | Yu | H04L 27/2647 370/208 |
| 2009/0109937 A1 | 4/2009 | Cave et al. | |
| 2009/0110038 A1 | 4/2009 | Montojo et al. | |
| 2009/0307554 A1 | 12/2009 | Marinier et al. | |
| 2009/0316811 A1 | 12/2009 | Maeda et al. | |
| 2010/0157924 A1 | 6/2010 | Prasad et al. | |
| 2012/0057547 A1 | 3/2012 | Lohr et al. | |
| 2012/0063390 A1 | 3/2012 | Yu et al. | |
| 2013/0201932 A1 | 8/2013 | Ko et al. | |
| 2013/0242904 A1 | 9/2013 | Sartori et al. | |
| 2014/0056237 A1 | 2/2014 | Eriksson et al. | |
| 2014/0056278 A1 | 2/2014 | Marinier et al. | |
| 2014/0071954 A1 | 3/2014 | Au et al. | |
| 2014/0177487 A1* | 6/2014 | Hammarwall | H04W 72/042 370/336 |
| 2014/0200684 A1* | 7/2014 | Mizutani | G05B 19/4185 700/23 |
| 2014/0362832 A1 | 12/2014 | Rudolf et al. | |
| 2015/0208387 A1 | 7/2015 | Awad et al. | |
| 2016/0183293 A1 | 6/2016 | Lei et al. | |
| 2016/0270045 A1 | 9/2016 | Mukkavilli et al. | |
| 2016/0270116 A1 | 9/2016 | Lin et al. | |
| 2016/0270123 A1 | 9/2016 | Wang | |
| 2017/0013565 A1 | 1/2017 | Pelletier et al. | |
| 2020/0163075 A1 | 5/2020 | Mukkavilli et al. | |

FOREIGN PATENT DOCUMENTS

| | | | |
|---|---|---|---|
| CN | 102474376 A | 5/2012 | |
| CN | 103929371 A | 7/2014 | |
| CN | 103988439 A | 8/2014 | |
| CN | 104221407 A | 12/2014 | |
| CN | 104247534 A | 12/2014 | |
| CN | 104254995 A | 12/2014 | |
| CN | 104301082 A | 1/2015 | |
| CO | 6270281 A2 | 4/2011 | |
| EP | 2015601 A1 | 1/2009 | |
| EP | 2515489 A1 | 10/2012 | |
| EP | 2755357 A1 | 7/2014 | |
| GB | 2504544 A | 2/2014 | |
| JP | 2013503541 A | 1/2013 | |
| JP | 2014510507 A | 4/2014 | |
| JP | 2015502068 A | 1/2015 | |
| JP | 2017529782 A | 10/2017 | |
| RU | 2208913 C2 | 7/2003 | |
| WO | 2011024131 A2 | 3/2011 | |
| WO | 2011150265 A1 | 12/2011 | |
| WO | 2012068141 A1 | 5/2012 | |
| WO | 2012139075 A1 | 10/2012 | |
| WO | 2013112703 A2 | 8/2013 | |
| WO | 2014021058 A2 | 2/2014 | |
| WO | 2014023361 A1 | 2/2014 | |
| WO | 2014040531 A1 | 3/2014 | |
| WO | 2014113537 A1 | 7/2014 | |

OTHER PUBLICATIONS

"3rd Generation Partnership Project; Technical Specification Group Radio Access Network; Evolved Universal Terrestrial Radio Access (E-UTRA); Multiplexing and channel coding (Release 12)", 3GPP Standard; 3GPP TS 36.212, 3rd Generation Partnership Project (3GPP), Mobile Competence Centre ; 650, Route Des Lucioles ; F-06921 Sophia-Antipolis Cedex ; France, vol. RAN WG1, No. V12.3.0, Jan. 3, 2015 (Jan. 3, 2015), pp. 1-89, XP050927387, [retrieved on Jan. 3, 2015] section 5.3.3.1,4A; pp. 71, 72.

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

"3rd Generation Partnership Project; Technical Specification Group Radio Access Network; Evolved Universal Terrestrial Radio Access (E-UTRA); Physical layer procedures (Release 12)," 3GPP Standard; 3GPP TS 36.213, 3rd Generation Partnership Project (3GPP), Mobile Competence Centre ; 650, Route Des Lucioles ; F-06921 Sophia-Antipolis Cedex ; France, vol. RAN WG1, No. V12.4.0, Jan. 7, 2015 (Jan. 7, 2015), pp. 1-225, XP050927573, [retrieved on Jan. 7, 2015].

International Preliminary Report on Patentability—PCT/US2016/018783, The International Bureau of WIPO—Geneva, Switzerland, Sep. 19, 2017.

International Preliminary Report on Patentability—PCT/US2016/021014 The International Bureau of WIPO—Geneva, Switzerland, Sep. 19, 2017.

International Search Report and Written Opinion—PCT/US2016/021014—ISA/EPO—Jun. 7, 2016.

International Search Report and Written Opinion—PCT/US2016/018783—ISA/EPO—Jun. 1, 2016.

\* cited by examiner

SUBFRAME STRUCTURE WITH EMBEDDED CONTROL SIGNALING

PRIORITY CLAIM

This application is a continuation of, and claims priority to and the benefit of non-provisional patent application Ser. No. 16/752,465 filed in the United States Patent and Trademark Office on Jan. 24, 2020, which application is a continuation of, and claims priority to and the benefit of non-provisional patent application Ser. No. 14/952,685 filed in the United States Patent and Trademark Office on Nov. 25, 2015, and claims priority to and benefit of provisional patent application No. 62/133,391 filed in the United States Patent and Trademark Office on Mar. 15, 2015, the entire content of each of which is hereby incorporated herein by reference.

TECHNICAL FIELD

Aspects of the present disclosure relate, generally, to wireless communication and, more particularly, to a subframe structure with embedded control signaling.

BACKGROUND

Wireless communication networks are widely deployed to provide various communication services such as telephony, video, data, messaging, broadcasts, and so on. Such networks, which are usually multiple access networks, support communications for multiple users by sharing the available network resources. Within such wireless networks a variety of data services may be provided, including voice, video, and emails. More recently, wireless communication networks are being utilized for an even broader range of services, including mission critical applications and remote control applications such as telesurgery. In such applications, relatively low latency can enable a suitably high quality of service. That is, the time for information to be transmitted from a communication device, and a response received back at the communication device, may need to be relatively rapid. As the demand for mobile broadband access continues to increase, research and development continue to advance wireless communication technologies to meet the growing demand for mobile broadband access and to enhance the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides a method of wireless communication. The method may be performed by a scheduling entity. The method may include determining a priority of a first set of data scheduled for transmission during a first transmission time interval (TTI), and whether a second set of data ready for transmission has a higher priority than the first set of data. The second set of data may be transmitted during the first TTI when the second set of data has the higher priority. An override indicator may be transmitted that is at least partially embedded in the a data portion of a subframe, wherein the override indicator is transmitted after a duration of time that is less than a total time duration of the first TTI, and wherein the override indicator is configured to indicate that the first set of data scheduled for transmission during the first TTI is overridden by the second set of data having the higher priority.

In another aspect, the present disclosure provides an apparatus configured for wireless communication. The apparatus includes a memory, a transceiver, and at least one processor communicatively coupled to the memory and the transceiver. The at least one processor and the memory may be configured to determine a priority of a first set of data scheduled for transmission during a first transmission time interval (TTI), and whether a second set of data ready for transmission has a higher priority than the first set of data. The at least one processor and the memory may be configured to transmit, during the first TTI, the second set of data when the second set of data has the higher priority. The at least one processor and the memory may be configured to transmit, after a duration of time that is less than a total time duration of the first TTI, an override indicator that is at least partially embedded in a data portion of a subframe, wherein the override indicator is configured to indicate that the first set of data scheduled for transmission during the first TTI is overridden by the second set of data having the higher priority.

In an additional aspect, the present disclosure provides a method of wireless communication. The method may be performed by a subordinate entity. The method may include utilizing an air interface to receive a transmission during a first transmission time interval (TTI) scheduled for a first set of data, the transmission received during the first TTI comprising a second set of data overriding at least a portion of the first set of data scheduled for the transmission during the first TTI, wherein the second set of data has a higher priority than the first set of data. The method may further include utilizing the air interface to receive a transmission including an override indicator that is at least partially embedded in the a data portion of a subframe, wherein the override indicator is received after a duration of time that is less than a total time duration of the first TTI, and wherein the override indicator is configured to indicate that the first set of data scheduled for transmission during the first TTI is overridden by the second set of data having the higher priority.

In another aspect, the present disclosure provides an apparatus configured for wireless communication. The apparatus includes a memory, a transceiver, and at least one processor communicatively coupled to the memory and the transceiver. The at least one processor and the memory may be configured to utilize the transceiver to receive a transmission during a first transmission time interval (TTI) scheduled for a first set of data, the transmission received during the first TTI comprising a second set of data overriding at least a portion of the first set of data scheduled for the transmission during the first TTI, wherein the second set of data has a higher priority than the first set of data. The at least one processor and the memory may be configured to utilize the transceiver to receive a transmission including an override indicator that is at least partially embedded in the a data portion of a subframe, wherein the override indicator is received after a duration of time that is less than a total time duration of the first TTI, and wherein the override indicator is configured to indicate that the first set of data scheduled for transmission during the first TTI is overridden by the second set of data having the higher priority.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others). Such services and/or applications may benefit from latency targets that can differ considerably from one another. However, the one-size-fits-all latency configuration of an LTE network can make multiplexing of traffic with different latency targets challenging. The spectrum compatibility of a system that supports such diverse latency targets can also be challenging. For example, time multiplexing of regular traffic and low latency traffic (e.g., mission critical (MiCr) data) may violate certain requirements of the low latency traffic (e.g., MiCr data). Furthermore, reserved frequency domain resources for low latency traffic (e.g., MiCr data) may limit the peak rate and trunking efficiency. Accordingly, support for multiplexing various types, classes, and categories of traffic and services having considerably different latency characteristics may enhance such next-generation networks (e.g., 5G networks) and the overall user experience.

Figure 1:
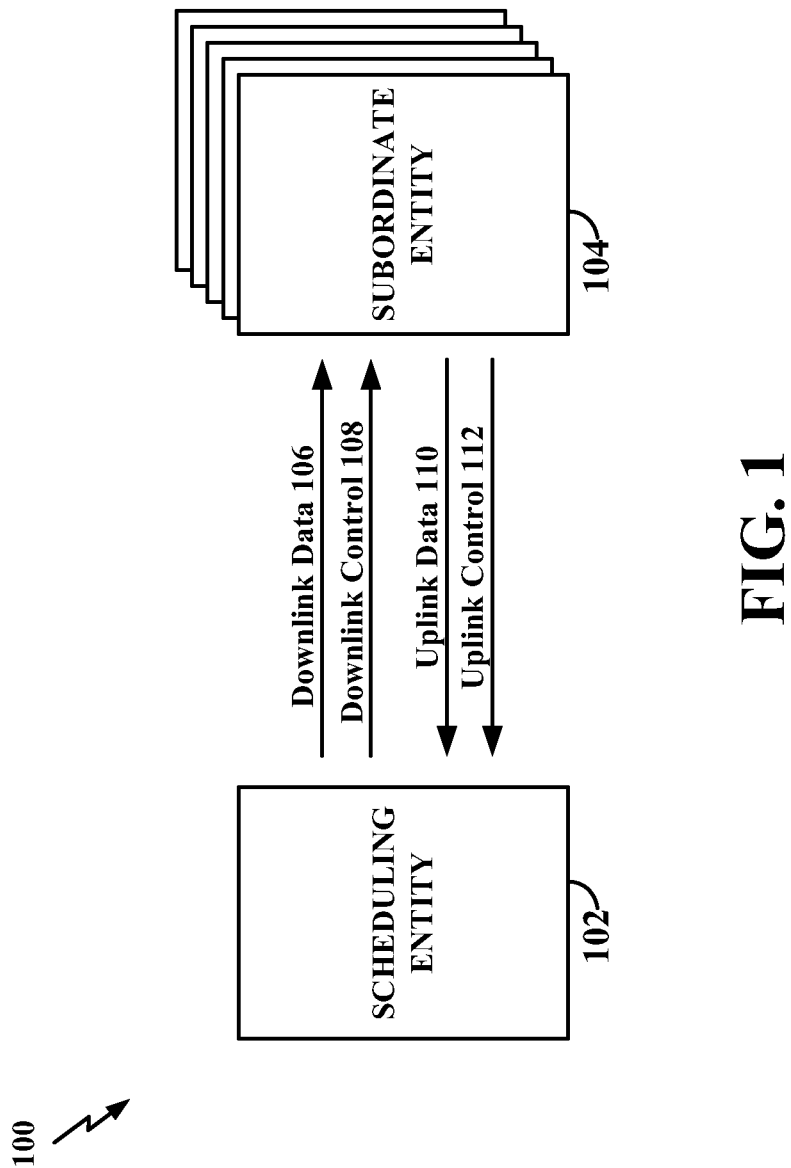
FIG. 1 is a diagram illustrating an example of various communications between a scheduling entity and one or more subordinate entities according to aspects of the present disclosure.

FIG. 1 is a diagram 100 illustrating an example of various communications between a scheduling entity 102 and one or more subordinate entities 104 according to aspects of the present disclosure. In accordance with aspects of the present disclosure, the term 'downlink' (DL) may refer to a point-to-multipoint transmission originating at the scheduling entity 102, and the term 'uplink' (UL) may refer to a point-to-point transmission originating at the subordinate entity 104. Broadly, the scheduling entity 102 is a node or device responsible for scheduling traffic in a wireless communication network, including various DL and UL transmissions. The scheduling entity 102 may sometimes be referred to as a scheduler, and/or any other suitable term without deviating from the scope of the present disclosure. The scheduling entity 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, the subordinate entity 104 is a node or device that receives scheduling and/or control information, including but not limited to scheduling grants, synchronization or timing information, or other control information from another entity in the wireless communication network, such as the scheduling entity 102. The subordinate entity 104 may be a referred to as a schedulee, and/or any other suitable term without deviating from the scope of the present disclosure. The subordinate entity 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

As used herein, 'control channel(s)' may sometimes be used to communicate grant information. The scheduling entity 102 may transmit DL data channel(s) 106 and DL control channel(s) 108. The subordinate entity 104 may transmit UL data channel(s) 110 and UL control channel(s) 112. The channels illustrated in FIG. 1 are not necessarily all of the channels that may be utilized by the scheduling entity 102 and/or the subordinate entity 104. Those of ordinary skill in the art will recognize that other channels may be utilized in addition to those illustrated, such as other data, control, and feedback channels.

As described above, some data may be characterized as MiCr data. In some configurations, MiCr data refers to data that has a relatively low or ultra-low latency requirement. For example, the latency requirement of MiCr data may be lower than the latency requirement of other data included in that subframe. Generally, latency refers to the delay associated with receipt of data at its intended destination. In some configurations, MiCr data refers to data that has a relatively high priority requirement. For example, the priority requirement of MiCr data may be higher than the priority requirement of other data included in the subframe. Generally, priority refers to the importance or time-sensitivity of the data. Data having relatively higher importance and/or relatively greater time-sensitivity should be received before other data having relatively lesser importance and/or relatively lesser time-sensitivity. In some configurations, MiCr data refers to data that has a relatively high reliability requirement. For example, the reliability requirement of MiCr data may be greater than the reliability requirement of other data included in that subframe. Generally, reliability refers to how consistently data is successfully received by the intended destination without errors. When MiCr data and nominal data coexist in the same band, it is possible that MiCr data has a smaller TTI (subframe) than nominal data TTI (subframe). Hence, from the short (MiCr) TTI point of view, nominal data in each short TTI could have scheduling following the previous TTI (subframe), which corresponds to the beginning of a long TTI. When scheduling needs to be changed due to the presence of MiCr data, the scheduling change information needs to be delivered to nominal data through a short TTI control/indicator channel. Such control/indicator channel information could be embedded in an allocated data resource.

Figure 2:
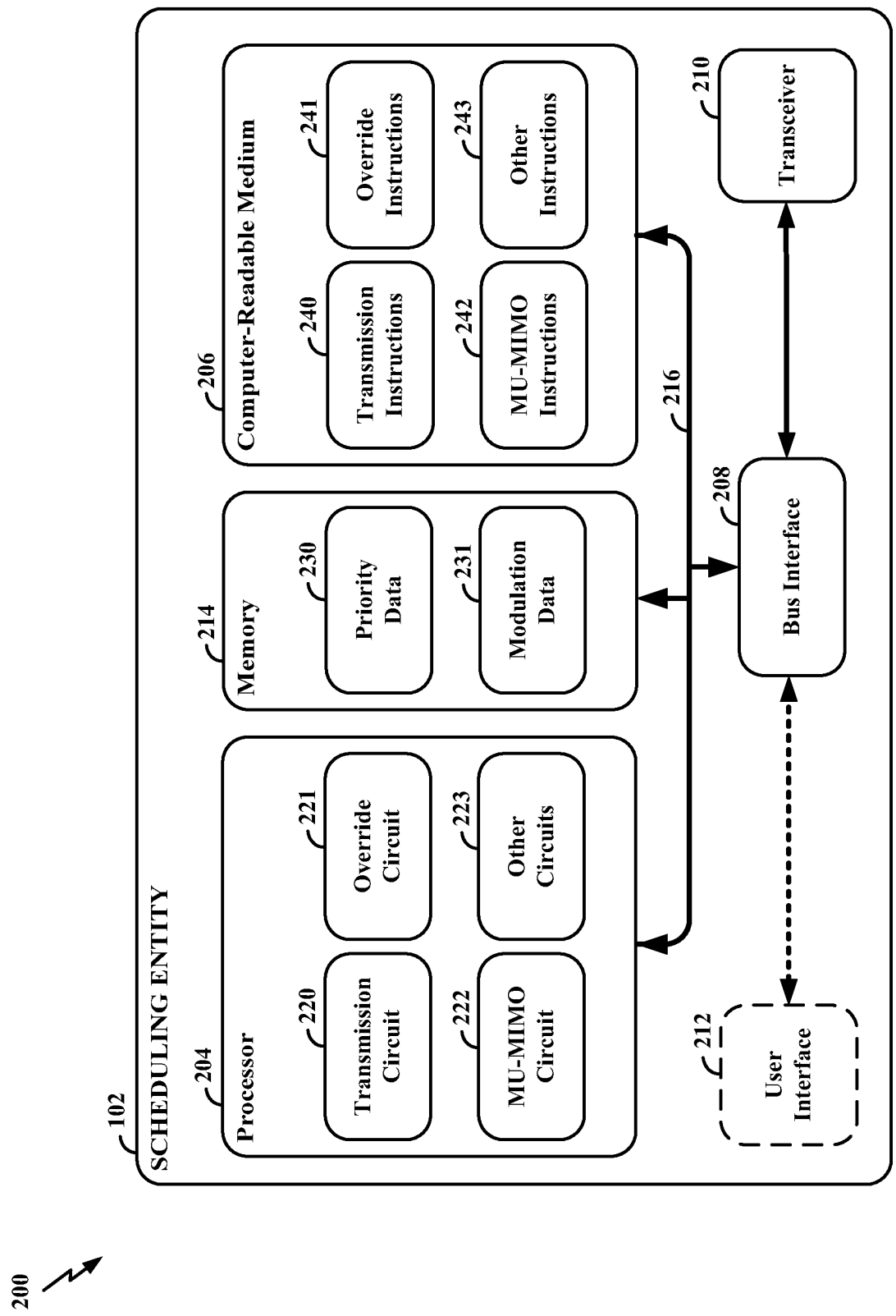
FIG. 2 is a diagram illustrating an example of a hardware implementation of a scheduling entity according to aspects of the present disclosure.

FIG. 2 is a diagram 200 illustrating an example of a hardware implementation of the scheduling entity 102 according to aspects of the present disclosure. The scheduling entity 102 may include a user interface 212. The user interface 212 may be configured to receive one or more inputs from a user of the scheduling entity 102. The user interface 212 may also be configured to display information to the user of the scheduling entity 102. The user interface 212 may exchange data via the bus interface 208. The scheduling entity 102 may also include a transceiver 210. The transceiver 210 may be configured to receive data and/or transmit data in communication with another apparatus. The transceiver 210 provides a means for communicating with another apparatus via a wired or wireless transmission medium. The transceiver 210 may also provide the means for utilizing an air interface to transmit a subframe comprising a data portion and a control channel that is at least partly embedded within the data portion. For example, without deviating from the scope of the scope of the present disclosure, the control channel may be partly embedded within the data portion or the control channel may be completely embedded within the data portion. The phrase 'at least partly' may also include similar phrases (e.g., at least partially, at least in portion, and/or at least in part) without deviating from the scope of the present disclosure. According to aspects of the present disclosure, the term(s) 'communicate' and/or 'communicating' refer to at least one of a transmission or a reception. One of ordinary skill in the art will understand that many types of technologies may perform such communication without deviating from the scope of the present disclosure.

The scheduling entity 102 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may include a transmission circuit 220. The transmission circuit 220 may include various hardware components and/or may perform various algorithms that provide the means for utilizing an air interface to transmit a subframe comprising a data portion and a control channel that is at least partly embedded within the data portion. The control channel may include one or more pilot tones at least partly embedded in the data portion of the subframe. The control channel may be different from scheduling information transmitted prior to the transmission of the subframe.

The processor 204 may also include an override circuit 221. The override circuit 221 may include various hardware components and/or may perform various algorithms that provide the means for determining a priority of data previously scheduled for transmission in the subframe. The override circuit 221 may also include various hardware components and/or may perform various algorithms that provide the means for determining whether other data ready for transmission has a priority higher than the priority of the data previously scheduled for transmission in the subframe. When the other data ready for transmission has a priority higher than a priority of the data previously scheduled for transmission in the subframe, the control channel may include an override indicator. In some examples, the override indicator is configured to indicate that the data previously scheduled for transmission in the subframe is overridden by other data having a priority higher than the priority of the data previously scheduled for transmission in the subframe. In some other examples, the override indicator is configured to indicate a puncturing of resource elements in the data portion of the subframe to include other data having a priority higher than the priority of the data previously scheduled for transmission in the subframe.

The processor 204 may also include a multi-user multiple-input multiple-output (MU-MIMO) circuit 222. The MU-MIMO circuit 222 may include various hardware components and/or may perform various algorithms that provide the means for determining whether the subframe is included in a MU-MIMO transmission. When the subframe is included in the MU-MIMO transmission, the control channel may include a modulation indicator. The modulation indicator may be configured to indicate information corresponding to a modulation of another apparatus (e.g., another UE(s)) that is included in the MU-MIMO transmission.

The foregoing description provides a non-limiting example of the processor 204 of the scheduling entity 102. Although various circuits 220, 221, 222 are described above, one of ordinary skill in the art will understand that the processor 204 may also include various other circuits 223 that are in addition and/or alternative(s) to the aforementioned circuits 220, 221, 222. Such other circuits 223 may provide the means for performing any one or more of the functions, methods, processes, features and/or aspects described herein.

The computer-readable medium 206 may store computer-executable code. The computer-executable code may include instructions according to various aspects of the present disclosure. The computer-executable code may include instructions configured to perform various functions and/or enable various aspects described herein. The computer-executable instructions may be executed by various hardware components (e.g., the processor 204 and/or any of its circuits 220, 221, 222, 223) of the scheduling entity 102. The computer-executable instructions may be a part of various software programs and/or software modules. The computer-executable code may include transmission instructions 240 configured to utilize an air interface to transmit a subframe comprising a data portion and a control channel that is at least partly embedded within the data portion. The control channel may include one or more pilot tones at least partly embedded in the data portion of the subframe. The control channel may be different from scheduling information transmitted prior to the transmission of the subframe.

The computer-executable code may include override instructions 241. The override instructions 241 may be configured to determine a priority of data previously scheduled for transmission in the subframe. The override instructions 241 may also be configured to determine whether other data ready for transmission has a priority higher than the priority of the data previously scheduled for transmission in the subframe. When the other data ready for transmission has a priority higher than a priority of the data previously scheduled for transmission in the subframe, the control channel may include an override indicator. In some examples, the override indicator is configured to indicate that the data previously scheduled for transmission in the subframe is overridden by other data having a priority higher than the priority of the data previously scheduled for transmission in the subframe. In some other examples, the override indicator is configured to indicate a puncturing of resource elements in the data portion of the subframe to include other data having a priority higher than the priority of the data previously scheduled for transmission in the subframe.

The computer-executable code may include MU-MIMO instructions 242. The MU-MIMO instructions 242 may be configured to determine whether the subframe is included in a MU-MIMO transmission. When the subframe is included in the MU-MIMO transmission, the control channel may include a modulation indicator. The modulation indicator may be configured to indicate information corresponding to a modulation of another apparatus (e.g., another UE(s)) that is included in the MU-MIMO transmission.

The foregoing description provides a non-limiting example of the computer-readable medium 206 of the scheduling entity 102. Although various computer-executable instructions 240, 241, 242 are described above, one of ordinary skill in the art will understand that the computer-readable medium 206 may also include various other computer-executable instructions 243 that are in addition and/or alternative(s) to the aforementioned computer-executable instructions 240, 241, 242. Such other computer-executable instructions 243 may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include priority data 230. The priority data 230 may include information pertaining to the priority of the data for transmission. As described in greater detail above, the duration of the TTI may vary based on the priority of the data for transmission. For instance, the TTI may be inversely proportional to the priority of the data for transmission. In some examples, the priority of the data may be related to the quality of service (QoS) of the data. For example, data having a relatively high QoS may have a relatively high priority. Some communication networks (e.g., 5G networks) may provide various levels of QoS to different applications. Accordingly, variable TTI design may be implemented in certain examples, as described in greater detail herein.

The memory 214 may also include modulation data 231. The modulation data may include information pertaining to the modulation order, scheme, and/or configuration of one or more subframes included in a MU-MIMO transmission. For example, a stream of the MU-MIMO transmission may include a subframe that includes a control channel that has a modulation indicator, wherein that modulation indicator provides information about the modulation order of another stream of the MU-MIMO transmission in the same resource element. The scheduling entity 102 may use the modulation data 231 to encode the modulation of such subframes prior to transmitting the MU-MIMO transmission to the subordinate entity/entities 104. Although various types of data of the memory 214 are described above, one of ordinary skill in the art will understand that the memory 214 may also include various other data that are in addition and/or alternative(s) to the aforementioned data 230, 231. Such other data may be associated with any one or more of the functions, methods, processes, features and/or aspects described herein.

One of ordinary skill in the art will also understand that the scheduling entity 102 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits, which are well known in the art.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
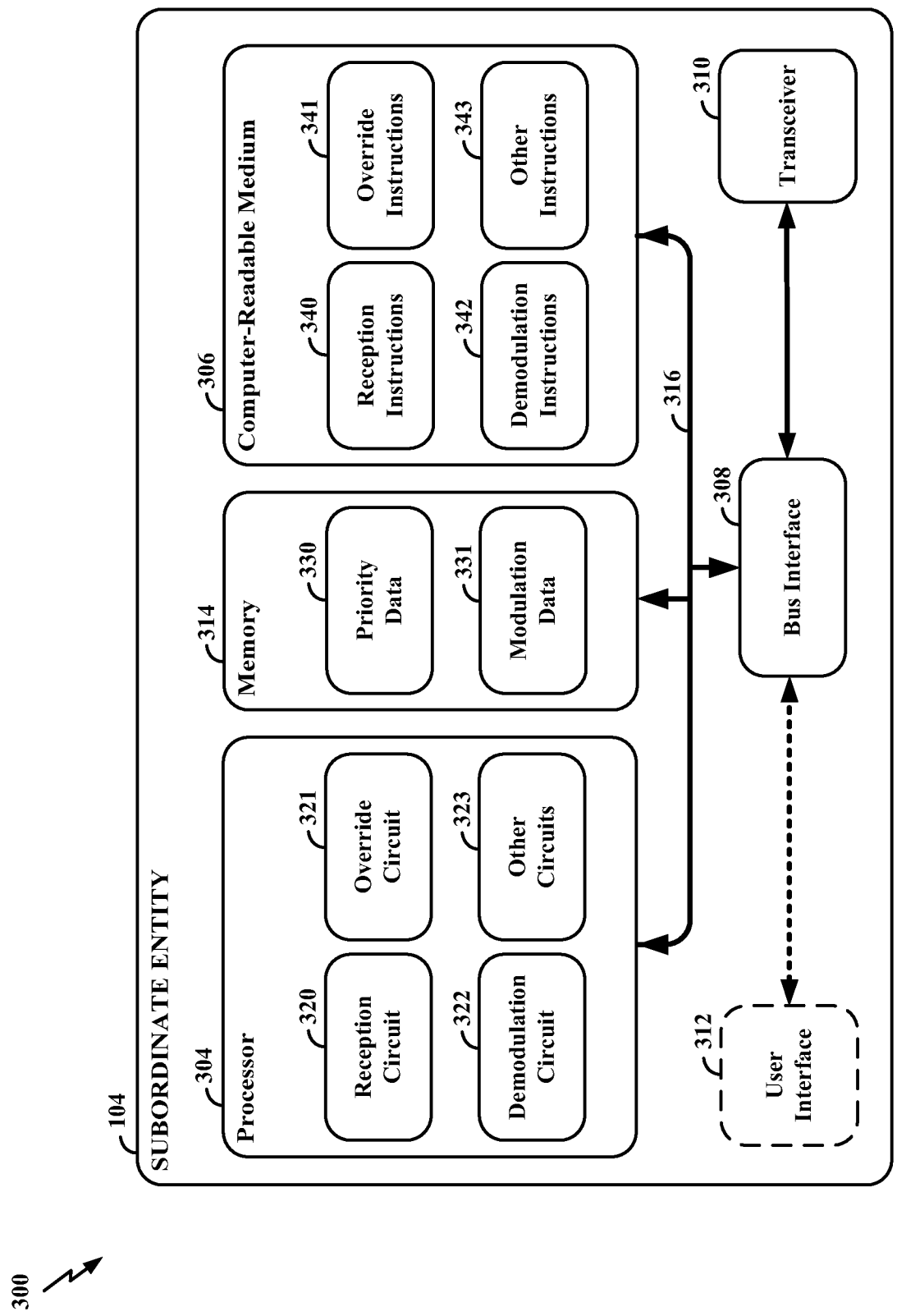
FIG. 3 is a diagram illustrating an example of a hardware implementation of the subordinate entity according to aspects of the present disclosure.

FIG. 3 is a diagram 300 illustrating an example of a hardware implementation of the subordinate entity 104 according to aspects of the present disclosure. The subordinate entity 104 may include a user interface 312. The user interface 312 may be configured to receive one or more inputs from a user of the subordinate entity 104. The user interface 312 may also be configured to display information to the user of the subordinate entity 104. The user interface 312 may exchange data via the bus interface 308. The subordinate entity 104 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may also provide the means for utilizing an air interface to receive a subframe comprising a data portion and a control channel that is at least partly embedded within the data portion. According to aspects of the present disclosure, the term(s) 'communicate' and/or 'communicating' refer to at least one of a transmission or a reception. One of ordinary skill in the art will understand that many types of technologies may perform such communication without deviating from the scope of the present disclosure.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a reception circuit 320. The reception circuit 320 may include various hardware components and/or may perform various algorithms that provide the means for utilizing an air interface to receive a subframe comprising a data portion and a control channel that is at least partly embedded within the data portion. The control channel may include one or more pilot tones at least partly embedded in the data portion of the subframe. The control channel may be different from scheduling information transmitted prior to the transmission of the subframe.

The processor 304 may also include an override circuit 321. When other data ready for transmission has a priority higher than a priority of the data previously scheduled for transmission in the subframe, the control channel may include an override indicator. In some examples, the override indicator is configured to indicate that the data previously scheduled for transmission in the subframe is overridden by other data having a priority higher than the priority of the data previously scheduled for transmission in the subframe. In some other examples, the override indicator is configured to indicate a puncturing of resource elements in the data portion of the subframe to include other data having a priority higher than the priority of the data previously scheduled for transmission in the subframe. The override circuit 321 may include various hardware components and/ or may perform various algorithms that provide the means for receiving the other data having the higher priority instead of the previously scheduled data.

The processor 304 may also include a demodulation circuit 322. When the subframe is included in the MU-MIMO transmission, the control channel may include a modulation indicator. The modulation indicator may be configured to indicate information corresponding to a modulation of another apparatus (e.g., another UE(s)) that is included in the MU-MIMO transmission. The demodulation circuit 322 may include various hardware components and/ or may perform various algorithms that provide the means for jointly demodulating the subframe of data intended for the apparatus with other apparatuses scheduled in a same subframe using the modulation indicator.

The foregoing description provides a non-limiting example of the processor 304 of the subordinate entity 104. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may store computer-executable code. The computer-executable code may include instructions according to various aspects of the present disclosure. The computer-executable code may include instructions configured to perform various functions and/or enable various aspects described herein. The computer-executable instructions may be executed by various hardware components (e.g., the processor 304 and/or any of its circuits 320, 321, 322, 323) of the subordinate entity 104. The computer-executable instructions may be a part of various software programs and/or software modules. The computer-executable code may include reception instructions 340 configured to utilize an air interface to receive a subframe comprising a data portion and a control channel that is at least partly embedded within the data portion. The control channel may include one or more pilot tones at least partly embedded in the data portion of the subframe. The control channel may be different from scheduling information transmitted prior to the transmission of the subframe.

The computer-executable code may include override instructions 341. When the other data ready for transmission has a priority higher than a priority of the data previously scheduled for transmission in the subframe, the control channel may include an override indicator. In some examples, the override indicator is configured to indicate that the data previously scheduled for transmission in the subframe is overridden by other data having a priority higher than the priority of the data previously scheduled for transmission in the subframe. In some other examples, the override indicator is configured to indicate a puncturing of resource elements in the data portion of the subframe to include other data having a priority higher than the priority of the data previously scheduled for transmission in the subframe. The override instructions 341 may be configured to receive the other data having the higher priority instead of the previously scheduled data.

The computer-executable code may include demodulation instructions 342. When the subframe is included in the MU-MIMO transmission, the control channel includes a modulation indicator. The modulation indicator may be configured to indicate information corresponding to a modulation of another apparatus (e.g., another UE(s)) that is included in the MU-MIMO transmission. The demodulation instructions 342 may be configured to jointly demodulate the subframe of data intended for the apparatus with other apparatuses scheduled in a same subframe using the modulation indicator.

The foregoing description provides a non-limiting example of the computer-readable medium 306 of the subordinate entity 104. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include priority data 330. The priority data 330 may include information pertaining to the priority of the data for transmission. As described in greater detail above, the duration of the TTI may vary based on the priority of the data for transmission. For instance, the TTI may be inversely proportional to the priority of the data for transmission. In some examples, the priority of the data may be related to the QoS of the data. For example, data having a relatively high QoS may have a relatively high priority.

The memory 314 may also include modulation data 331. The modulation data may include information pertaining to the modulation order, scheme, and/or configuration of one or more subframes included in a MU-MIMO transmission. For example, a stream of the MU-MIMO transmission may include a subframe that includes a control channel that has a modulation indicator, wherein that modulation indicator provides information about the modulation order of a subframe included in another stream of the MU-MIMO transmission. The subordinate entity 104 may use the modulation data 331 to demodulate such subframes after receiving the MU-MIMO transmission from the subordinate entity/entities 104. Although various types of data of the memory 314 are described above, one of ordinary skill in the art will understand that the memory 314 may also include various other data that are in addition and/or alternative(s) to the aforementioned data 330, 331. Such other data may be associated with any one or more of the functions, methods, processes, features and/or aspects described herein.

One of ordinary skill in the art will also understand that the subordinate entity 104 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits, which are well known in the art.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
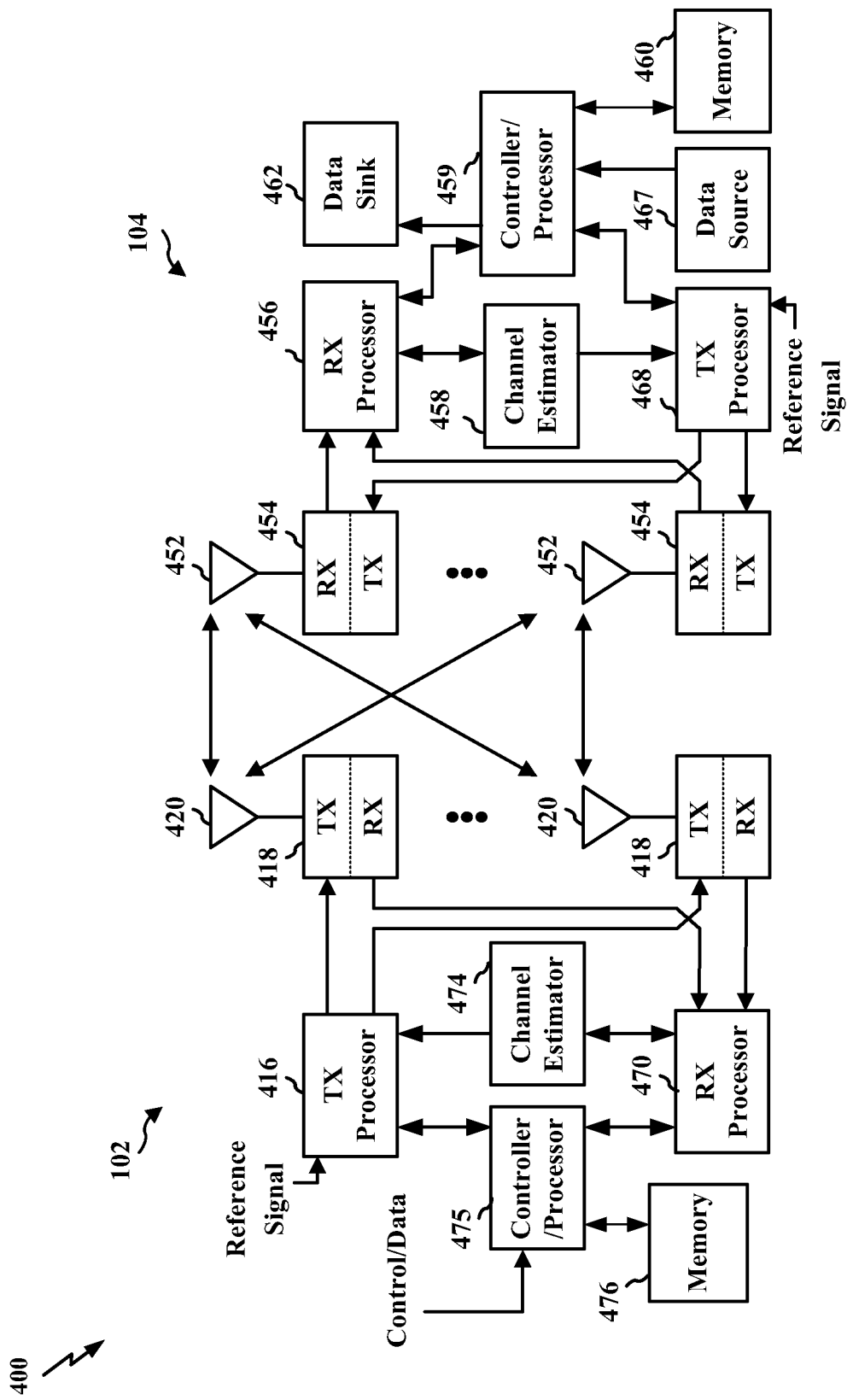
FIG. 4 is a diagram of a scheduling entity in communication with a subordinate entity in an access network according to aspects of the present disclosure.

FIG. 4 is a diagram 400 of the scheduling entity 102 in communication with the subordinate entity 104 in an access network according to aspects of the present disclosure. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 104 based on various priority metrics. The controller/processor 475 is also responsible for HARQ operations, retransmission of lost packets, and signaling to the subordinate entity 104.

The transmit (TX) processor 416 implements various signal processing functions for the L1 layer (i.e., physical layer). The signal processing functions include coding and interleaving to facilitate forward error correction (FEC) at the subordinate entity 104 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an orthogonal frequency-division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 104. Each spatial stream may then be provided to a different antenna 420 via a separate transmitter 418TX. Each transmitter 418TX may modulate an RF carrier with a respective spatial stream for transmission.

At the subordinate entity 104, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 104. If multiple spatial streams are destined for the subordinate entity 104, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 102. These soft decisions may be based on channel estimates computed by the channel estimator 458. The soft decisions are then decoded and deinterleaved to recover the data and control signals that were originally transmitted by the scheduling entity 102 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 102, the controller/processor 459 implements the L2 layer for the user plane and the control plane by providing header compression, ciphering, packet segmentation and reordering, and multiplexing between logical and transport channels based on radio resource allocations by the scheduling entity 102. The controller/processor 459 is also responsible for HARQ operations, retransmission of lost packets, and signaling to the scheduling entity 102.

Channel estimates derived by a channel estimator 458 from a reference signal or feedback transmitted by the scheduling entity 102 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the scheduling entity 102 in a manner similar to that described in connection with the receiver function at the subordinate entity 104. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 104. Upper layer packets from the controller/processor 475 may be provided to the core network. The controller/processor 475 is also responsible for error detection using an ACK and/or NACK protocol to support HARQ operations.

As used herein, 'air interface' may refer to the air interface of an apparatus (e.g., scheduling entity 102 and/subordinate entity 104) for wireless communication utilizing a method of encoding digital data on multiple carrier frequencies. In some examples, such an air interface may be an OFDM air interface. Generally, OFDM is a frequency-division multiplexing (FDM) scheme that may be used as a digital multi-carrier modulation method. Generally, FDM is a technique by which the total bandwidth available in a communication medium is divided into a series of non-overlapping frequency sub-bands, each of which may be utilized to carry a separate signal. In OFDM, a large number of closely spaced orthogonal sub-carrier signals are used to carry data on several parallel data streams or channels. Each sub-carrier may be modulated with a particular modulation order, scheme, and/or configuration, such as quadrature amplitude modulation (QAM) or phase-shift keying (PSK). An OFDM air interface may be deployed in many communication systems, such as wideband digital communication, wireless networks, mobile communications, digital subscriber line (DSL), Internet access, and many others. Although various examples of an OFDM air interface are provided herein, one of ordinary skill in the art will understand that any air interface described herein may be implemented or deployed in various other technologies without deviating from the scope of the present disclosure. In some examples, the air interface may be a single-carrier frequency-division multiple access (SC-FDMA) air interface. In some examples, the air interface may be a code division multiple access (CDMA) air interface.

Figure 5:
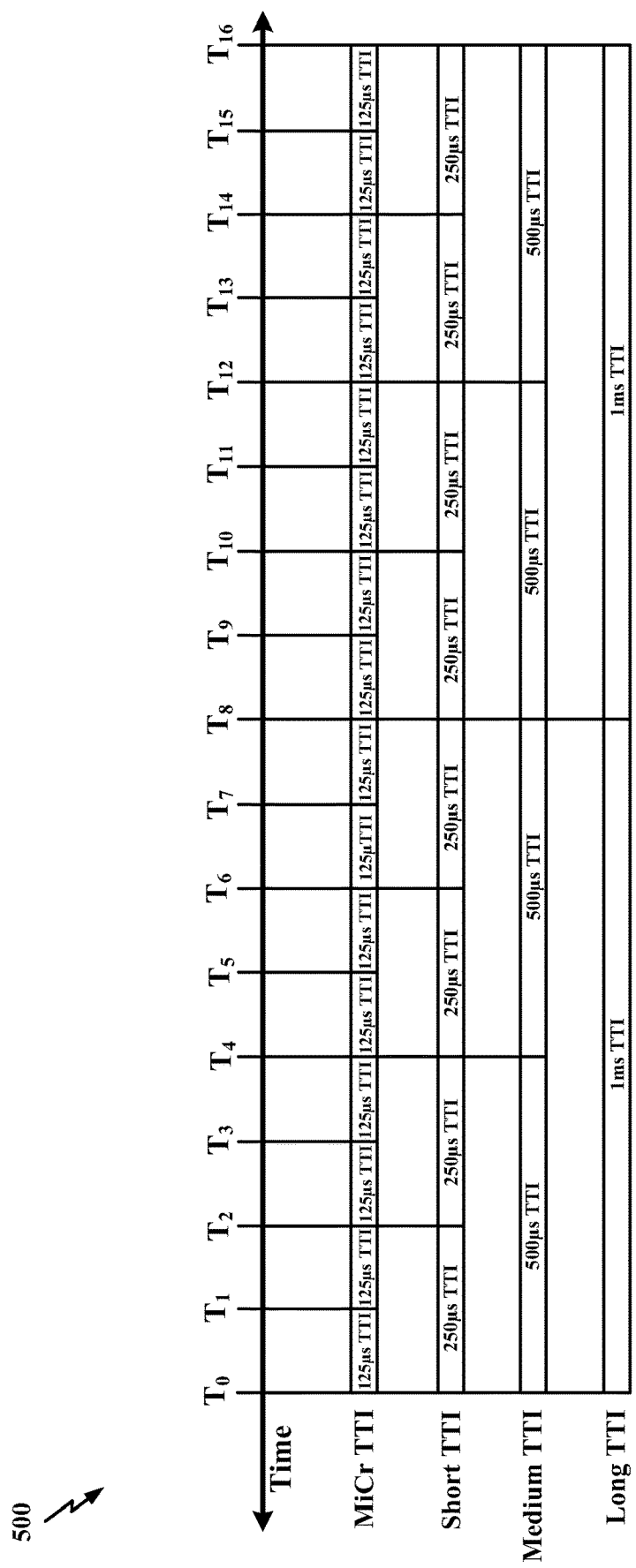
FIG. 5 is a diagram illustrating an example of various transmission time intervals (TTIs) according to aspects of the present disclosure.

FIG. 5 is a diagram 500 illustrating an example of various transmission time intervals (TTIs) according to aspects of the present disclosure. Generally, a TTI refers to a parameter related to the encapsulation of data from higher layer into frames for transmission on the radio link layer. A TTI may refer to a duration of a transmission on the radio link. The TTI may relate to the size of the data blocks passed from higher network layers to the radio link layer. For example, data may be divided at the transmitter in blocks, and the length of time required to transmit one (or more) such blocks may determine the TTI.

The duration of the TTI may vary based on one or more factors. In some examples, the duration of the TTI may vary based on the priority of the data for transmission. For instance, the TTI may be inversely proportional to the priority of the data for transmission. If the data for transmission is relatively high in priority, then the TTI may be relatively shorter in duration. Conversely, if the data for transmission is relatively low in priority, then the TTI may be relatively longer in duration. Accordingly, as illustrated in FIG. 5, the TTI of MiCr data is transmitted during TTIs that are shorter than the TTIs in which other data is transmitted. In some examples, the priority of the data may be related to the quality of service (QoS) of the data. For example, data having a relatively high QoS may have a relatively high priority. Generally, QoS refers to a qualitative measure of the quality of service, which may take into account many factors, such as error rates, bit rate, throughput, transmission delay, jitters, and various other factors.

As described in greater detail above, MiCr data refers to data that has a relatively low or ultra-low latency requirement. For example, the latency requirement of MiCr data may be lower than the latency requirement of other data included in that subframe. Generally, latency refers to the delay associated with receipt of data at its intended destination. In some configurations, MiCr data refers to data that has a relatively high priority requirement. For example, the priority requirement of MiCr data may be higher than the priority requirement of other data included in the subframe. Generally, priority refers to the importance or time-sensitivity of the data. Data having relatively higher importance and/or relatively greater time-sensitivity should be received before other data having relatively lesser importance and/or relatively lesser time-sensitivity. In some configurations, MiCr data refers to data that has a relatively high reliability requirement. For example, the reliability requirement of MiCr data may be greater than the reliability requirement of other data included in that subframe. Generally, reliability refers to how consistently data is successfully received by the intended destination without errors.

In FIG. 5, various time markers are noted (for reference purposes) as time $T_0$ through time $T_{16}$. A long TTI is shown as having a duration of 1 millisecond (ms). A medium TTI is shown as having a duration of 500 microseconds (μs). A short TTI is shown as having a duration of 250 μs. A MiCr TTI is shown as having a duration of 125 μs. The TTI durations shown in FIG. 5 represent one of many examples. One of ordinary skill in the art will understand that any one or more of such durations may be altered based on specific implementations and design constraints without deviating from the scope of the present disclosure. In many systems, scheduling information is transmitted prior to transmission of the data portion of the subframe, and that scheduling information may be configured to schedule data for the resource elements in the data portion of that subframe. For example, one of the long TTIs illustrated in FIG. 5 ends at time $T_8$. For that long TTI, the scheduling information may be transmitted at (or around) the beginning of the TTI (e.g., at/around time $T_0$ for the long TTI spanning from time $T_0$ through time $T_8$).

In some circumstances, a higher layer (e.g., a medium access control (MAC) layer) of the scheduling entity 102 may provide to a lower layer (e.g., a physical (PHY) layer) some data having a priority that is higher than the priority of other data previously scheduled for transmission. For example, the scheduling entity 102 may have already scheduled data for transmission during the long TTI spanning from time $T_0$ through time $T_8$. However, at some time prior to the end of that long TTI (e.g., time $T_8$), the scheduling entity 102 may determine that some data ready for transmission has a priority higher than the data previously scheduled for transmission during that long TTI. For example, at time $T_4$, the scheduling entity 102 may receive data having a priority higher than the priority of the data previously scheduled for transmission during that long TTI.

Because such data has a relatively higher priority, the duration of the TTI for that relatively higher-priority data will be shorter than the duration of the long TTI (e.g., 1 ms). If such relatively higher-priority data is MiCr data, then the duration of the TTI for such data may be 125 μs. Because such data (e.g., MiCr data) has been designated as having a relatively higher priority than some other data (e.g., the data previously scheduled for transmission during the long TTI spanning from time $T_0$ through time $T_8$), it may be preferable for such relatively higher-priority data to override the transmission of the relatively lower-priority data.

However, existing systems do not include a control channel embedded in the data portion of the subframe for communicating such override information to the subordinate entity 104. For example, if data for a short TTI becomes ready for transmission in the middle of a scheduled long TTI, the data for the short TTI will take priority and override the long TTI. Accordingly, the scheduled long TTI will become temporarily blocked until the data for the short TTI data finishes transmitting. Accordingly, in such existing systems, any information indicating such an override would be transmitted at (or around the beginning) of a following long TTI (e.g., at/around time $T_8$ of the long TTI spanning from time $T_8$ through time $T_{16}$).

In comparison to such existing systems, various aspects of the present disclosure provide a subframe structure that includes a control channel that is at least partly embedded within the data portion. One of ordinary skill in the art will understand that the term 'control channel' (as used herein) encompasses various alternative terms without deviating from the scope of the present disclosure. Such alternative terms include, but are not limited to: indicator channel, control indicator channel, override indicator channel, optimization indicator channel, puncturing indicator channel, MiCr puncturing indicator channel, and/or various other suitable terms. The control channel may be delivered via broadcast or unicast (which may require additional channelization of the control channel) without deviating from the scope of the present disclosure.

This control channel is different from the scheduling information that is transmitted prior to transmission of the subframe. As described above, such scheduling information is configured to schedule data for resource elements in the data portion of the subframe. In some examples, the control channel includes an override indicator when the other data ready for transmission has a priority higher than the priority of the data previously scheduled for transmission in the subframe. The override indicator is configured to indicate that the data previously scheduled for transmission in the subframe is overridden by other data having a priority higher than the priority of the data previously scheduled for transmission in the subframe.

Accordingly, the scheduling entity 102 can communicate the aforementioned override information during (e.g., instead of after) the transmission of the data portion of the long TTI. For example, referring to FIG. 5, the scheduling entity 102 may communicate such override information at time $T_4$ (e.g., prior to the end of the transmission of the data portion of the subframe in the long TTI spanning from time $T_0$ through time $T_8$) instead of at time $T_8$ (e.g., at/around the beginning of the next TTI). In other words, the override indicator may be provided after a duration of time that is less than the entire duration of the TTI. For example, referring to FIG. 5, the scheduling entity 102 may provide the override indicator after 500 μs, which is less than the duration of the entire 1 ms duration of the long TTI.

The subordinate entity 104 may monitor grants at the boundaries of the long TTIs and may also monitor the aforementioned control channel at the boundaries of shorter TTIs. For example, referring to the example illustrated in FIG. 5, the subordinate entity 104 may monitor grants at time $T_8$ (e.g., boundary of the long TTI) as well as at time(s) $T_1, T_2, T_3, T_4, T_5, T_6, T_7$ (e.g., boundary of the MiCr TTI(s)). One of ordinary skill in the art will understand that the shorter TTI does not necessarily always have to be the MiCr TTI. For example, the shorter TTI may be the medium TTI and/or the short TTI. As illustrated in FIG. 5, the medium TTI has boundaries at $T_4, T_8$, and the short TTI has boundaries at $T_2, T_4, T_6, T_8$.

Put in another way, the override indicator may be configured to indicate a puncturing of resource elements in the data portion of the subframe to include other data having a priority higher than the priority of the data previously scheduled for transmission in the subframe. In other words, the override indicator may facilitate puncturing detection. The override indicator may be embedded into each resource sub-block (e.g., sub-band). By providing such an indication to the subordinate entity 104, the subordinate entity 104 is informed that the resource elements previously scheduled for the relatively lower-priority data have been 'taken away' or overridden by the relatively higher-priority data now included in the relatively shorter TTI.

In some examples, the punctured resource elements may be configured to indicate the QoS level and/or the TTI duration of the relatively higher-priority data. In some examples, the puncturing may even be performed across many resource blocks in order to increase the number of resource elements used for the override indicator, thereby improving reliability of that override indicator being successfully received and processed by the subordinate entity 104. In some examples, the resource elements may be turned into pilot tones after QoS-level bit payload detection for channel estimation enhancements.

Figure 6:
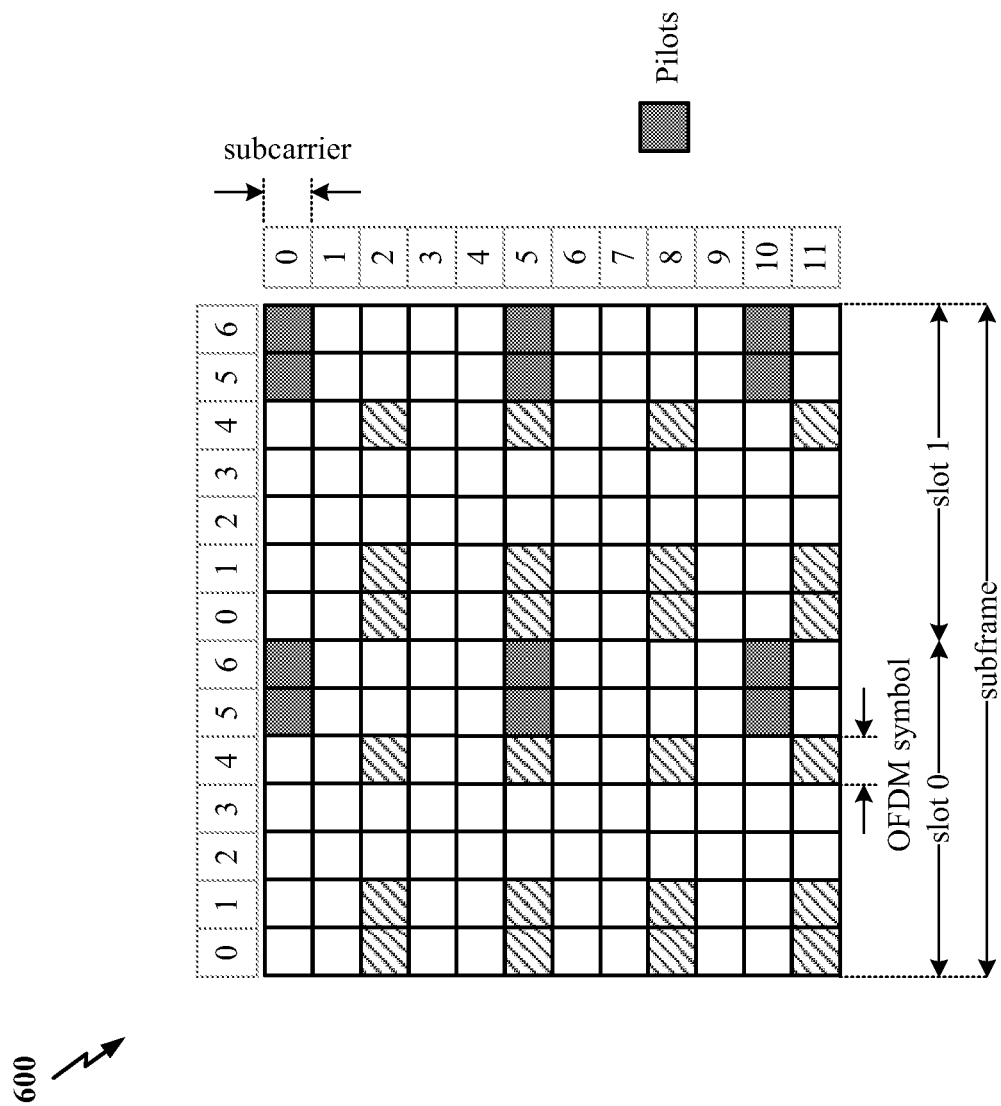
FIG. 6 is a diagram illustrating an example of a subframe structure according to aspects of the present disclosure.

FIG. 6 is a diagram 600 illustrating an example of a subframe structure according to aspects of the present disclosure. One of ordinary skill in the art will understand that this is a non-limiting example and various other subframe structures may be within the scope of the present disclosure. In some examples, the subframe structure illustrate in FIG. 6 is a DL subframe structure. A resource grid may be used to represent two time slots, each time slot including a resource block. The resource grid is divided into multiple resource elements. In a normal cyclic prefix, a resource block may contain twelve (12) consecutive subcarriers in the frequency domain and seven (7) consecutive OFDM symbols in the time domain, for a total of eighty-four (84) resource elements. In an extended cyclic prefix, a resource block may contain twelve (12) consecutive subcarriers in the frequency domain and six (6) consecutive OFDM symbols in the time domain, for a total of seventy-two (72) resource elements. Some of the resource elements include DL reference signals. The number of bits carried by each resource element may vary according to the modulation scheme, order, and/or configuration implemented by the system.

In some examples, the control channel (e.g., as described above with reference to FIG. 5) may be included in one or more pilot tones that are at least partly embedded in the data portion of the subframe. For illustrative purposes, various pilot tones are illustrated in FIG. 6, and these pilot tones are embedded in the data portion of the subframe. As described in greater detail above, these pilot tones may include an override indicator when the other data ready for transmission by the scheduling entity 102 has a priority higher than the priority of the data previously scheduled for transmission in the subframe. The override indicator may be configured to indicate that the data previously scheduled for transmission in the subframe is overridden by other data having a priority higher than the priority of the data previously scheduled for transmission in the subframe. The override indicator may also be configured to indicate a puncturing of resource elements in the data portion of the subframe to include other data having a priority higher than the priority of the data previously scheduled for transmission in the subframe. For example, one of the pilot tones may indicate a puncturing of at least one of the resource element of the data portion of the subframe illustrated in FIG. 6 in order to include other data (e.g., MiCr data) having a priority higher than the priority of the data (e.g., non-MiCr data) previously scheduled for transmission in the subframe. By providing such an indication to the subordinate entity 104, the subordinate entity 104 is informed that the resource elements previously scheduled for the relatively lower-priority data have been 'taken away' or overridden by the relatively higher-priority data now included in the relatively shorter TTI.

In some examples, the punctured resource elements may be configured to indicate the QoS level and/or the TTI duration of the relatively higher-priority data. In some examples, the puncturing may even be performed across many resource blocks in order to increase the number of resource elements used for the override indicator, thereby improving reliability of that override indicator being successfully received and processed by the subordinate entity 104. In some examples, the resource elements carrying indicator information may be turned into pilot tones after QoS-level bit payload detection for channel estimation enhancements.

Figure 7:
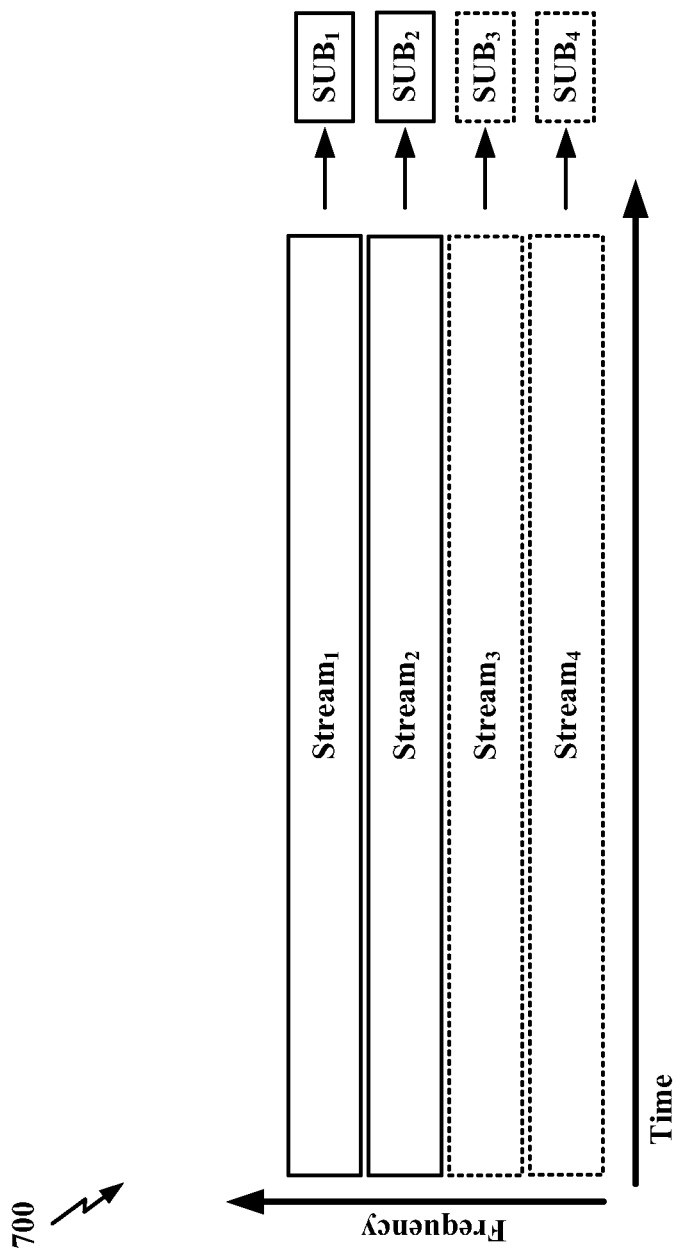
FIG. 7 is an example of a diagram of a multi-user multiple-input multiple-output (MU-MIMO) transmission according to aspects of the present disclosure.

FIG. 7 is a diagram 700 illustrating an example of a MU-MIMO transmission according to aspects of the present disclosure. For example, the scheduling entity 102 may transmit such a MU-MIMO transmission to two (or more) of the subordinate entities 104. Generally, a MU-MIMO transmission refers to the concurrent transmission of two (or more) streams of information, wherein each stream is destined to (e.g., intended for) different receivers (e.g., users). (Unlike MU-MIMO, a single-user multiple-input multiple-output (SU-MIMO) transmission refers to the transmission a number of streams to a single receiver at a single time.) For example, referring to FIG. 7, $Stream_1$ may be a stream of information that is destined to (e.g., intended for) a first subordinate entity 104 (e.g., $SUB_1$), and $Stream_2$ may be a stream of information that is destined to (e.g., intended for) a second subordinate entity 104 (e.g., $SUB_2$). Although the example illustrated in FIG. 7 shows four streams destined to (e.g., intended for) four different receivers, one of ordinary skill in the art will understand that various other permutations and/or numbers of streams and/or subordinate entities may be implemented without deviating from the scope of the present disclosure.

Each of the streams (e.g., $Stream_1$ through $Stream_4$) may include one or more subframes, such as the subframes described in greater detail above with reference to FIGS. 5 and 6. Each of the subordinate entities (e.g., $SUB_1$ through $SUB_4$) may receive all of the streams (e.g., $Stream_1$ through $Stream_4$), but each of those subordinate entities (e.g., $SUB_1$ through $SUB_4$) may utilize certain information (e.g., specific information in the header (not shown)) to determine which of the streams is destined to (e.g., intended for) that particular subordinate entity 104. For example, $SUB_1$ may utilize such header information (not shown) to determine that $Stream_1$ is destined for (e.g., intended for) it. After making such a determination, each respective subordinate entity 104 (e.g., $SUB_1$ through $SUB_4$) may demodulate the stream(s) destined for (e.g., intended for) it.

In some circumstances, the subordinate entity 104 (e.g., $SUB_1$) may wish to know modulation information pertaining to a stream (e.g., $Stream_2$ through $Stream_4$) that is not destined to (intended for) that subordinate entity 104 (e.g., $SUB_1$). Knowing the modulation information pertaining to a stream (e.g., $Stream_2$ through $Stream_4$) that is not destined to (intended for) that subordinate entity 104 (e.g., $SUB_1$) may actually help that subordinate entity 104 (e.g., $SUB_1$) better perform MU-MIMO demodulation. Some existing devices may determine such modulation information 'blindly,' meaning that such a determination may be performed using trial-and-error, for example, because such information may not be explicitly known to that device. In comparison to such existing systems, aspects of the present disclosure provide for a control channel (e.g., as described in greater detail above with reference to FIGS. 5 and 6) that may include a modulation indicator when the subframe is included in a MU-MIMO transmission. One of ordinary skill in the art will understand that the term 'modulation indicator' (as used herein) encompasses various alternative terms without deviating from the scope of the present disclosure. Such alternative terms include: modulation classification assistance, modulation classification, modulation assistance, modulation information, and/or various other suitable terms.

The modulation indicator may be configured to indicate information corresponding to a modulation of another apparatus (e.g., another UE(s)) that is included in the MU-MIMO transmission. For example, referring to FIG. 7, $Stream_1$ may include a subframe that includes a control channel that has a modulation indicator, wherein that modulation indicator provides information about the modulation order of a subframe included in $Stream_2$. Even though the modulation indicator may provide information about the modulation order of a subframe included in $Stream_2$ (e.g., a stream not destined to/intended for $SUB_1$), $SUB_1$ may still utilize such a modulation indicator for demodulating a subframe included in $Stream_1$ (e.g., a stream that is destined to/intended for $SUB_1$). In some examples, this modulation indicator may be included in (e.g., embedded in/within) one or more of the pilot tones described above with reference to FIG. 6. In such examples, the pilot tones may be scrambled using known modulation information. Because the pilot tones may be scrambled using known modulation information, a subordinate entity 104 (e.g., $SUB_1$ through $SUB_4$) may be able to determine the modulation information based on the scrambling of the pilot tone(s). After modulation order detection, the pilot tones may be scrambled for pilot channel estimation.

Figure 8:
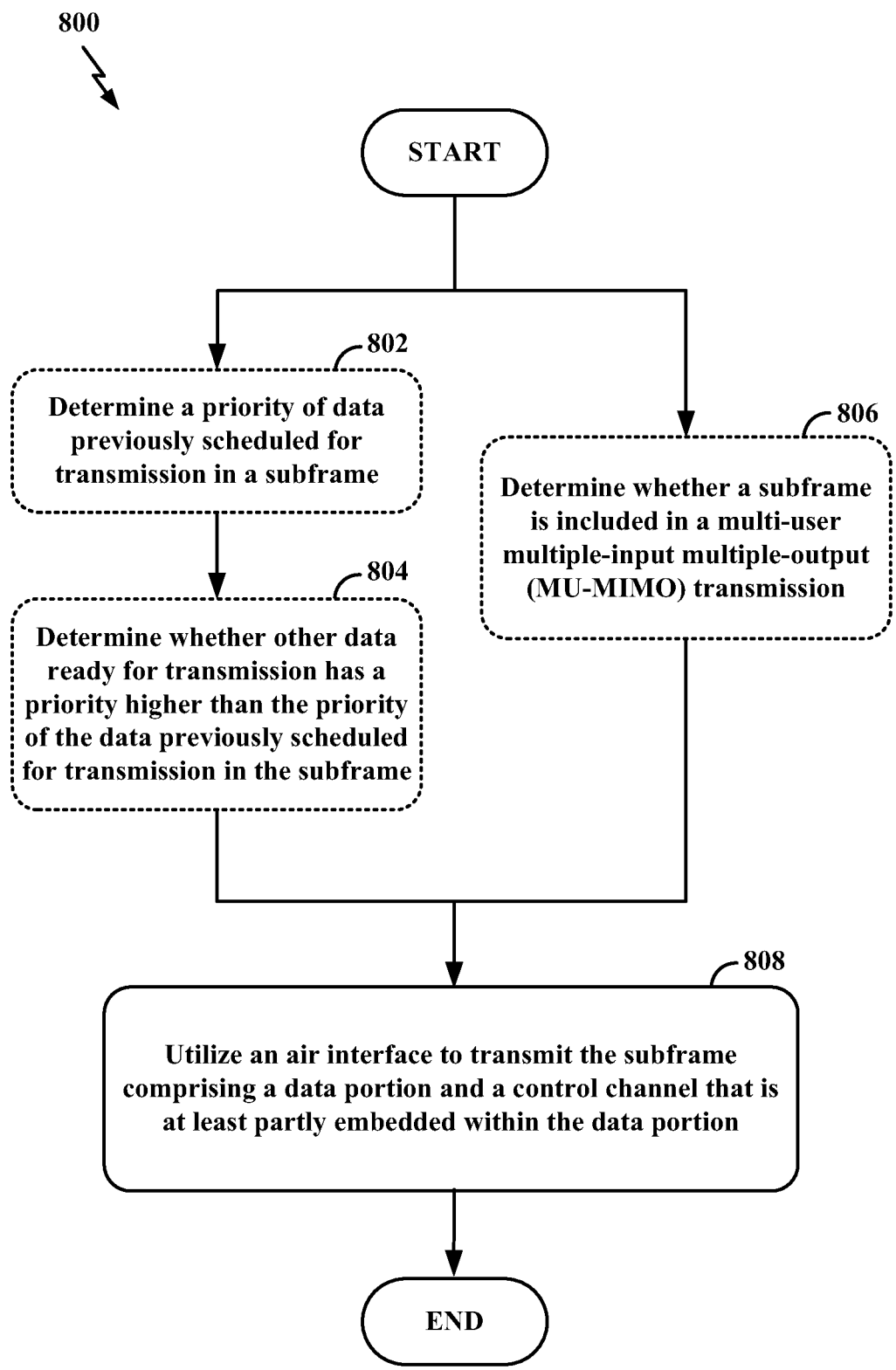
FIG. 8 is a diagram illustrating an example of various methods and/or processes that may be performed by a scheduling entity according to aspects of the present disclosure.

FIG. 8 is a diagram 800 illustrating an example of various methods and/or processes that may be performed by a scheduling entity 102 according to aspects of the present disclosure. In some examples, at block 802, the scheduling entity 102 may determine a priority of data previously scheduled for transmission in the subframe. For example, referring to FIG. 5, the scheduling entity 102 may determine the priority of the data previously scheduled for transmission during the long TTI spanning from time $T_0$ through time $T_8$. At block 804, the scheduling entity 102 may determine whether other data ready for transmission has a priority higher than the priority of the data previously scheduled for transmission in the subframe. For example, referring to FIG. 5, the scheduling entity 102 may determine whether any other data (e.g., MiCr data) corresponding to a relatively shorter TTI (and, therefore, having a relatively higher priority) is ready for transmission. If so, at block 806, the scheduling entity 102 may utilize an OFDM air interface to transmit a subframe comprising a data portion and a control channel that is at least partly embedded within the data portion. When the other data ready for transmission has the priority higher than the priority of the data previously scheduled for transmission in the subframe, the control channel may include an override indicator. In some configurations, the override indicator may be configured to indicate that the data previously scheduled for transmission in the subframe is overridden by other data having a priority higher than the priority of the data previously scheduled for transmission in the subframe. In some configurations, the override indicator may be configured to indicate a puncturing of resource elements in the data portion of the subframe to include other data having a priority higher than the priority of the data previously scheduled for transmission in the subframe.

In some other examples, at block 806, the scheduling entity 102 may determine whether the subframe is included in a MU-MIMO transmission. For example, the scheduling entity 102 may determine whether the subframe is included in any one of the streams (e.g., $Stream_1$ through $Stream_4$) in the MU-MIMO transmission illustrated in FIG. 7. At block 804, the scheduling entity 102 may utilize an OFDM air interface to transmit a subframe comprising a data portion and a control channel that is at least partly embedded within the data portion. When the subframe is included in the MU-MIMO transmission, the control channel may include a modulation indicator. The modulation indicator may be configured to indicate information corresponding to a modulation of another apparatus (e.g., another UE(s)) that is included in the MU-MIMO transmission. For example, referring to FIG. 7, $Stream_1$ may include a subframe that includes a control channel that has a modulation indicator, wherein that modulation indicator provides information about the modulation order of a subframe included in $Stream_2$. In some configurations, this modulation indicator may be included in one or more of the pilot tones described above with reference to FIG. 6.

The methods and/or processes described above with reference to FIG. 8 are provided for illustrative purposes and are not intended to limit the scope of the present disclosure. The methods and/or processes described with reference to FIG. 8 may be performed in sequences different from those illustrated therein without deviating from the scope of the present disclosure. Optional blocks are illustrated in dashed lines. Additionally, some or all of the methods and/or processes described with reference to FIG. 8 may be performed individually and/or together without deviating from the scope of the present disclosure. It is to be understood that the specific order or hierarchy of steps in the methods and/or processes disclosed is an illustration of exemplary methods and/or processes. Based upon design preferences, it is understood that the specific order or hierarchy of steps in the methods and/or processes may be rearranged. The accompanying claims may present elements of the various steps in a sample order, and are not meant to be limited to the specific order or hierarchy presented unless specifically recited therein.

Figure 9:
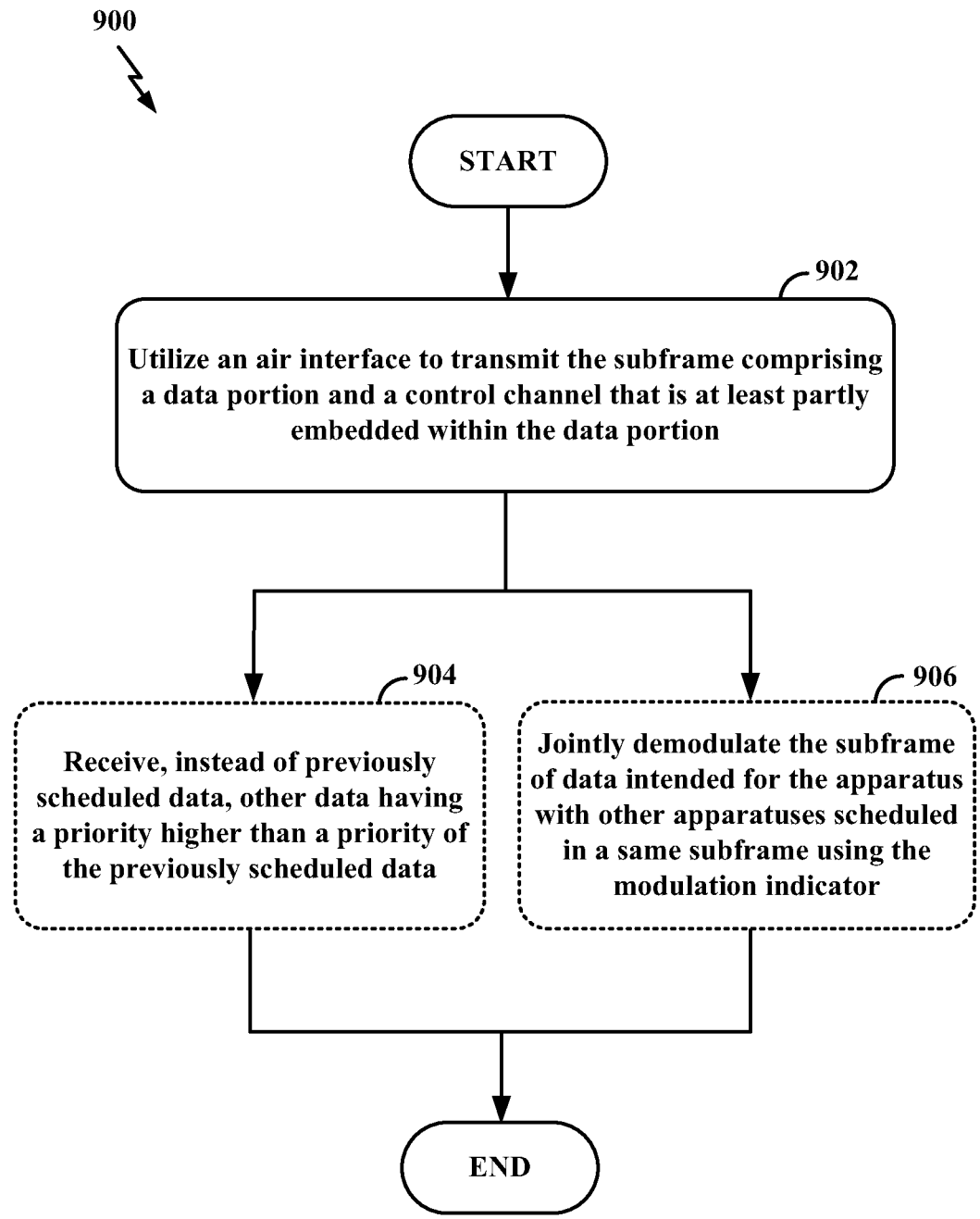
FIG. 9 is a diagram illustrating an example of various methods and/or processes that may be performed by a subordinate entity according to aspects of the present disclosure.

FIG. 9 is a diagram 900 illustrating an example of various methods and/or processes that may be performed by a subordinate entity 104 according to aspects of the present disclosure. At block 902, the subordinate entity 104 may utilize an OFDM air interface to receive a subframe comprising a data portion and a control channel that is at least partly embedded within the data portion.

When other data (e.g., MiCr data) ready for transmission has the priority higher than the priority of the data (e.g., non-MiCr data) previously scheduled for transmission in the subframe, the control channel may include an override indicator. In some configurations, the override indicator is configured to indicate that data (e.g., non-MiCr data) previously scheduled for transmission in the subframe is overridden by other data (e.g., MiCr data) having a priority higher than a priority of data previously scheduled for transmission in the subframe. In some other configurations, the override indicator is configured to indicate a puncturing of resource elements in the data portion of the subframe to include other data (e.g., MiCr data) having a priority higher than a priority of data (e.g., non-MiCr data) previously scheduled for transmission in the subframe. In the configurations wherein the control channel includes the override indicator, at block 904, the subordinate entity 104 may receive, instead of the previously scheduled data (e.g., non-MiCr data), the other data (e.g., MiCr data) having the priority higher.

When the subframe is included in a MU-MIMO transmission, the control channel may include a modulation indicator. The modulation indicator may be configured to indicate information corresponding to a modulation of another apparatus (e.g., another UE(s)) that is included in the MU-MIMO transmission. In the configurations wherein the control channel includes the modulation indicator, at block 906, the subordinate entity 104 may jointly demodulate the subframe of data intended for the apparatus with other apparatuses scheduled in a same subframe using the modulation indicator. For example, referring to FIG. 7, $SUB_1$ may use a modulation indicator included in a control channel of $Stream_2$ (e.g., a stream not destined to/intended for $SUB_1$) to demodulate a subframe included in $Stream_1$ (e.g., a stream destined to/intended for $SUB_1$).

The methods and/or processes described above with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Optional blocks are illustrated in dashed lines. Additionally, some or all of the methods and/or processes described with reference to FIG. 9 may be performed individually and/or together without deviating from the scope of the present disclosure. It is to be understood that the specific order or hierarchy of steps in the methods and/or processes disclosed is an illustration of exemplary methods and/or processes. Based upon design preferences, it is understood that the specific order or hierarchy of steps in the methods and/or processes may be rearranged. The accompanying claims may present elements of the various steps in a sample order, and are not meant to be limited to the specific order or hierarchy presented unless specifically recited therein.

Any one or more of the components, steps, features and/or functions described herein and/or illustrated in any one or more of the drawings may be rearranged and/or combined into a single component, step, feature or function or embodied in several components, steps, or functions. Additional elements, components, steps, and/or functions may also be added without departing from novel features disclosed herein. The apparatus, devices, and/or components described herein and/or illustrated in any one or more of the drawings may be configured to perform one or more of the methods, features, or steps described herein. The novel algorithms described herein may also be implemented in software and/or embedded in hardware. As those skilled in the art will readily appreciate, various aspects described throughout this disclosure may be extended to any suitable telecommunication system, network architecture, and communication standard. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. A method of wireless communication, the method comprising:
determining a priority of a first set of data scheduled for transmission during a first transmission time interval (TTI);
determining whether a second set of data ready for transmission has a higher priority than the first set of data;
transmitting, during the first TTI, the second set of data when the second set of data has the higher priority; and
transmitting an override indicator that is at least partially embedded in a data portion of a subframe, wherein the override indicator is transmitted after a duration of time that is less than a total time duration of the first TTI, and wherein the override indicator is configured to indicate that the first set of data scheduled for transmission during the first TTI is overridden by the second set of data having the higher priority.

2. The method of claim 1, wherein the override indicator is transmitted in a control channel that is at least partially embedded in the data portion.

3. The method of claim 2, wherein the control channel comprises one or more pilot tones at least partly embedded in the data portion of the subframe.

4. The method of claim 1, wherein the override indicator is transmitted during a second TTI after the first TTI.

5. The method of claim 1, wherein the override indicator is different from scheduling information transmitted prior to the transmission of the first TTI, wherein the scheduling information is configured to schedule data for resource elements in the first TTI.

6. The method of claim 1, wherein the override indicator is configured to indicate a puncturing of a resource element in the first TTI to include the second set of data having the higher priority.

7. The method of claim 1, further comprising:
determining whether the first TTI is included in a multi-user multiple-input multiple-output (MU-MIMO) transmission; and
transmitting a modulation indicator when the first TTI is included in the MU-MIMO transmission.

8. The method of claim 7, wherein the modulation indicator is configured to indicate information corresponding to a modulation of another apparatus that is included in the MU-MIMO transmission.

9. An apparatus configured for wireless communication, the apparatus comprising:
a memory;
a transceiver; and
at least one processor communicatively coupled to the memory and the transceiver, wherein the at least one processor and the memory are configured to:
determine a priority of a first set of data scheduled for transmission during a first transmission time interval (TTI);
determine whether a second set of data ready for transmission has a higher priority than the first set of data;
transmit, during the first TTI, the second set of data when the second set of data has the higher priority; and
transmit an override indicator that is at least partially embedded in a data portion of a subframe, wherein the override indicator is transmitted after a duration of time that is less than a total time duration of the first TTI, and wherein the override indicator is configured to indicate that the first set of data scheduled for transmission during the first TTI is overridden by the second set of data having the higher priority.

10. The apparatus of claim 9, wherein the override indicator is transmitted in a control channel that is at least partially embedded in the data portion.

11. The apparatus of claim 10, wherein the control channel comprises one or more pilot tones at least partly embedded in the data portion of the subframe.

12. The apparatus of claim 9, wherein the override indicator is transmitted during a second TTI after the first TTI.

13. The apparatus of claim 9, wherein the override indicator is different from scheduling information transmitted prior to transmission of the first TTI, wherein the scheduling information is configured to schedule data for resource elements in the data portion of the first TTI.

14. The apparatus of claim 9, wherein the override indicator is configured to indicate a puncturing of a resource element in the data portion of the first TTI to include the second set of data having the higher priority.

15. The apparatus of claim 9, wherein the at least one processor and the memory are further configured to:
determine whether the first TTI is included in a multi-user multiple-input multiple-output (MU-MIMO) transmission; and
transmitting a modulation indicator when the first TTI is included in the MU-MIMO transmission.

16. The apparatus of claim 15, wherein the modulation indicator is configured to indicate information corresponding to a modulation of another apparatus that is included in the MU-MIMO transmission.

17. A method of wireless communication, the method comprising:
utilizing an air interface to receive a transmission during a first transmission time interval (TTI) scheduled for a first set of data, the transmission received during the first TTI comprising a second set of data overriding at least a portion of the first set of data scheduled for the transmission during the first TTI, wherein the second set of data has a higher priority than the first set of data;
utilizing the air interface to receive a transmission including an override indicator that is at least partially embedded in a data portion of a subframe, wherein the override indicator is received after a duration of time that is less than a total time duration of the first TTI, and wherein the override indicator is configured to indicate that the first set of data scheduled for transmission during the first TTI is overridden by the second set of data having the higher priority.

18. The method of claim 17, wherein the override indicator is received after the second set of data is received.

19. The method of claim 17, wherein the override indicator is received during a second TTI after the first TTI.

20. The method of claim 17, wherein the override indicator is included in a control channel comprising one or more pilot tones at least partly embedded in the data portion of the subframe.

21. The method of claim 17, wherein the override indicator is different from scheduling information transmitted prior to transmission of the first TTI, wherein the scheduling information is configured to schedule data for resource elements in the first TTI.

22. The method of claim 17, wherein the override indicator is configured to indicate a puncturing of resource elements in the first TTI to include the second set of data having a priority higher than a priority of the first set of data.

23. The method of claim 17, wherein the transmission including the override indicator further comprises a modulation indicator when the first TTI is included in a multi-user multiple-input multiple-output (MU-MIMO) transmission, and wherein the modulation indicator is at least partially embedded in the data portion and is configured to indicate information corresponding to a modulation of another apparatus that is included in the MU-MIMO transmission.

24. The method of claim 23, further comprising:
jointly demodulating the transmission received during the first TTI intended for the apparatus with other apparatuses scheduled in a same TTI using the modulation indicator.

25. An apparatus configured for wireless communication, the apparatus comprising:
a memory;
a transceiver; and
at least one processor communicatively coupled to the memory and the transceiver, wherein the at least one processor and the memory are configured to:
utilize the transceiver to receive a transmission during a first transmission time interval (TTI) scheduled for a first set of data, the transmission received during the first TTI comprising a second set of data overriding at least a portion of the first set of data scheduled for the transmission during the first TTI, wherein the second set of data has a higher priority than the first set of data;
utilize the transceiver to receive a transmission including an override indicator that is at least partially embedded in the data portion, wherein the override indicator is received after a duration of time that is less than a total time duration of the first TTI, and wherein the override indicator is configured to indicate that the first set of data scheduled for transmission during the first TTI is overridden by the second set of data having the higher priority.

26. The apparatus of claim 25, wherein the override indicator is received after the second set of data is received.

27. The apparatus of claim 25, wherein the override indicator is received during a second TTI after the first TTI.

28. The apparatus of claim 25, wherein the override indicator is included in a control channel comprising one or more pilot tones at least partly embedded in the data portion of the subframe.

29. The apparatus of claim 25, wherein the override indicator is configured to indicate a puncturing of resource elements in the first TTI to include the second set of data having a priority higher than a priority of the first set of data.

30. The apparatus of claim 25, wherein:
the transmission including the override indicator further comprises a modulation indicator when the first TTI is included in a multi-user multiple-input multiple-output (MU-MIMO) transmission, and wherein the modulation indicator is at least partially embedded in the data portion and is configured to indicate information corresponding to a modulation of another apparatus that is included in the MU-MIMO transmission; and
the at least one processor and the memory are further configured to jointly demodulate the subframe of data intended for the apparatus with other apparatuses scheduled in a same subframe using the modulation indicator.

* * * * *